US010562210B2

(12) United States Patent
Parolini et al.

(10) Patent No.: US 10,562,210 B2
(45) Date of Patent: Feb. 18, 2020

(54) METHOD FOR FORMING PASSAGES IN COMPOSITE COMPONENTS

(71) Applicant: General Electric Company, Schenectady, NY (US)

(72) Inventors: Jason Robert Parolini, Anderson, SC (US); Matthew Troy Hafner, Honea Path, SC (US); James Joseph Murray, Piedmont, SC (US); Srikanth Chandrudu Kottilingam, Greenville, SC (US); Canan Uslu Hardwicke, Greenville, SC (US); John McConnell Delvaux, Fountain Inn, SC (US)

(73) Assignee: General Electric Company, Schenectady, NY (US)

( * ) Notice: Subject to any disclaimer, the term of this patent is extended or adjusted under 35 U.S.C. 154(b) by 352 days.

(21) Appl. No.: 15/465,726

(22) Filed: Mar. 22, 2017

(65) Prior Publication Data

US 2018/0272568 A1    Sep. 27, 2018

(51) Int. Cl.
*B29C 70/00* (2006.01)
*B29C 35/02* (2006.01)
(Continued)

(52) U.S. Cl.
CPC .............. *B29C 35/02* (2013.01); *B29C 33/38* (2013.01); *B29C 70/545* (2013.01); *B32B 18/00* (2013.01); *C04B 35/62645* (2013.01); *C04B 35/62844* (2013.01); *C04B 35/62876* (2013.01); *C04B 35/657* (2013.01); *C04B 35/803* (2013.01); *C04B 35/806* (2013.01); *B29L 2031/7504* (2013.01); *C04B 2235/3217* (2013.01);
(Continued)

(58) Field of Classification Search
CPC ....... B29C 70/685; B29C 70/70; B29C 70/72; B29C 70/742; B29C 70/78; B29C 70/80; B29C 70/82; B29C 70/545
See application file for complete search history.

(56) References Cited

U.S. PATENT DOCUMENTS 3,518,338 A * 6/1970 Tambussi ................ B29C 70/30
                                                    264/221
6,627,019 B2    9/2003  Jarmon et al.
(Continued)

FOREIGN PATENT DOCUMENTS

EP    2 657 210 A1    10/2013
JP    04072003 A *    3/1992

OTHER PUBLICATIONS

Extended European Search Report and Opinion issued in connection with corresponding EP Application No. 18161348.0 dated Aug. 22, 2018.

*Primary Examiner* — Timothy Kennedy
(74) *Attorney, Agent, or Firm* — Dority & Manning, P.A.

(57) ABSTRACT

The present disclosure is directed to a method for forming a passage in a composite component. The method includes forming a cavity in a fiber preform. The cavity forms a portion of the passage. The method also includes inserting a core into the cavity and placing one or more fiber plies onto the fiber preform to form a fiber preform assembly. The method further includes thermally processing the fiber preform assembly and densifying the fiber preform assembly to form the composite component. The method also includes removing the core from the composite component.

17 Claims, 4 Drawing Sheets

(51) Int. Cl.
  *C04B 35/80* (2006.01)
  *B32B 18/00* (2006.01)
  *B29C 70/54* (2006.01)
  *B29C 33/38* (2006.01)
  *C04B 35/626* (2006.01)
  *C04B 35/628* (2006.01)
  *C04B 35/657* (2006.01)
  *F01D 5/28* (2006.01)
  *B29L 31/00* (2006.01)

(52) U.S. Cl.
  CPC ........... *C04B 2235/3826* (2013.01); *C04B 2235/3873* (2013.01); *C04B 2235/524* (2013.01); *C04B 2235/5224* (2013.01); *C04B 2235/5244* (2013.01); *C04B 2235/5248* (2013.01); *C04B 2235/6026* (2013.01); *C04B 2235/6028* (2013.01); *C04B 2235/616* (2013.01); *C04B 2235/945* (2013.01); *C04B 2237/38* (2013.01); *C04B 2237/62* (2013.01); *C04B 2237/64* (2013.01); *F01D 5/282* (2013.01); *F01D 5/284* (2013.01); *F05D 2260/204* (2013.01); *F05D 2300/6033* (2013.01)

(56) References Cited

U.S. PATENT DOCUMENTS

| | | |
|---|---|---|
| 6,746,755 B2 | 6/2004 | Morrison et al. |
| 6,984,277 B2 | 1/2006 | Morrison et al. |
| 7,153,464 B2 | 12/2006 | Millard et al. |
| 7,238,247 B2 | 7/2007 | Bouillon et al. |
| 8,167,573 B2 | 5/2012 | Merrill et al. |
| 8,876,481 B2 | 11/2014 | Huang et al. |
| 2003/0059577 A1 | 3/2003 | Morrison et al. |
| 2003/0175453 A1 | 9/2003 | Steffier |
| 2008/0115887 A1 | 5/2008 | Kaye et al. |
| 2011/0048620 A1 | 3/2011 | Foucault et al. |
| 2013/0285296 A1 | 10/2013 | Gray et al. |
| 2014/0048978 A1 | 2/2014 | Taxacher et al. |
| 2014/0072736 A1 | 3/2014 | Gray et al. |
| 2014/0260281 A1 | 9/2014 | Innes |
| 2014/0261986 A1 | 9/2014 | Lazur et al. |
| 2014/0271161 A1 | 9/2014 | Lazur |
| 2015/0004000 A1 | 1/2015 | Freeman et al. |

* cited by examiner

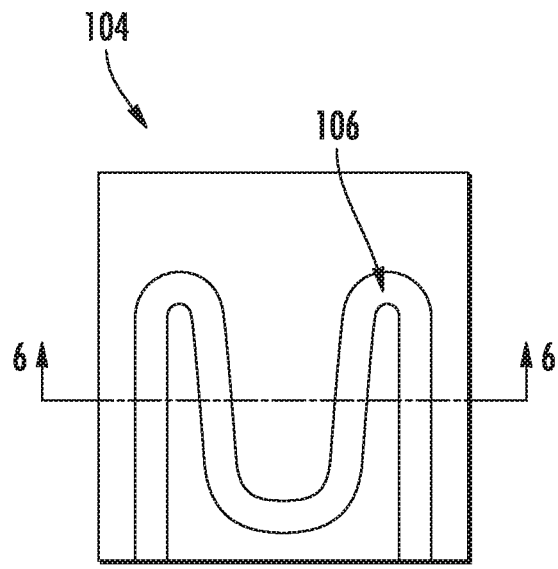 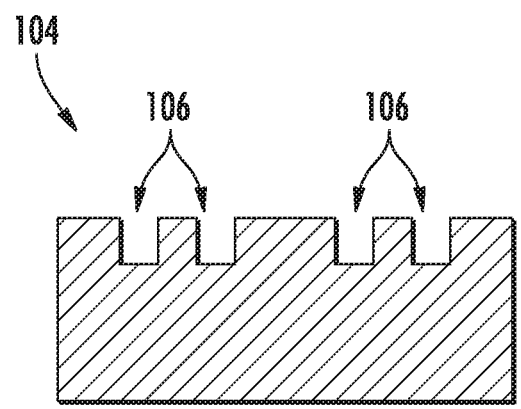
FIG. 5  FIG. 6
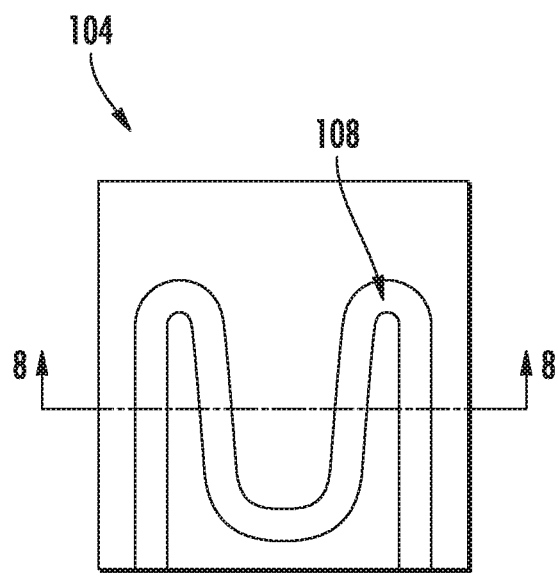 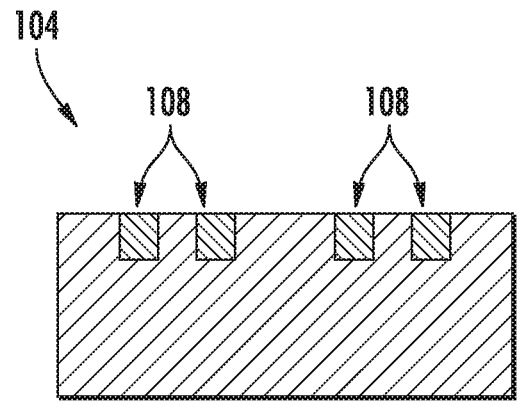
FIG. 7  FIG. 8

METHOD FOR FORMING PASSAGES IN COMPOSITE COMPONENTS

FIELD

The present disclosure generally relates to methods for forming composite components. More particularly, the present disclosure relates to methods for forming passages in composite components.

BACKGROUND

A gas turbine engine generally includes a compressor section, a combustion section, and a turbine section. The compressor section progressively increases the pressure of air entering the gas turbine engine and supplies this compressed air to the combustion section. The compressed air and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected to a generator to produce electricity.

In general, gas turbine engine performance and efficiency may be improved by increased combustion gas temperatures. Non-traditional high temperature materials, such as alumina-based or silicon carbide-based ceramic matrix composite (CMC) materials, are more commonly being used for various components within gas turbine engines. In particular, there is strong interest in replacing metal alloy components within the combustion and turbine sections with CMC materials. CMC materials can withstand higher operating temperatures than nickel-based super alloys and most refractory alloys. CMC materials require less cooling than nickel super alloys enabling higher turbine efficiencies. In certain instances, CMC materials may also reduce the structural demands on associated metal hardware, such as a metallic disk mated to a CMC rotor blade.

Although CMC components may withstand more extreme temperatures than components formed from traditional materials, certain CMC components still may require cooling features. For example, these CMC components may define various cooling passages extending therethrough. Cooling air may flow through these cooling passages, thereby cooling the CMC component. Nevertheless, the conventional methods of forming cooling passages in CMC components may result in cooling passages that limit the service life of the CMC component.

BRIEF DESCRIPTION

Aspects and advantages of the technology will be set forth in part in the following description, or may be obvious from the description, or may be learned through practice of the technology.

In one embodiment, the present disclosure is directed to a method for forming a passage in a composite component. The method includes forming a cavity in a fiber preform. The cavity forms a portion of the passage. The method also includes inserting a core into the cavity and placing one or more fiber plies onto the fiber preform to form a fiber preform assembly. The method further includes thermally processing the fiber preform assembly and densifying the fiber preform assembly to form the composite component. The method also includes removing the core from the composite component.

In another embodiment, the present disclosure is directed to a method for forming a passage in a ceramic matrix composite component. The method includes forming a fiber preform comprising a plurality of ceramic fibers and forming a cavity in the fiber preform. The cavity forms a portion of the passage. The method also includes inserting a core into the cavity and placing one or more ceramic fiber plies onto the fiber preform to form a fiber preform assembly. The method further includes thermally processing the fiber preform assembly and densifying the fiber preform assembly to form the ceramic matrix composite component. The method also includes removing the core from the ceramic matrix composite component.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which:

FIG. 5 is a top view of a fiber preform, illustrating a cavity defined thereby in accordance with embodiments of the present disclosure;

FIG. 6 is a cross-section side view of the fiber preform taken generally about line 6-6 in FIG. 5, further illustrating the cavity defined thereby in accordance with embodiments of the present disclosure;

FIG. 7 is a top view of a fiber preform, illustrating a core positioned within the cavity in accordance with embodiments of the present disclosure;

FIG. 8 is a cross-section side view of the fiber preform taken generally about line 8-8 in FIG. 7, further illustrating the core positioned within the cavity in accordance with embodiments of the present disclosure.

Figure 1:
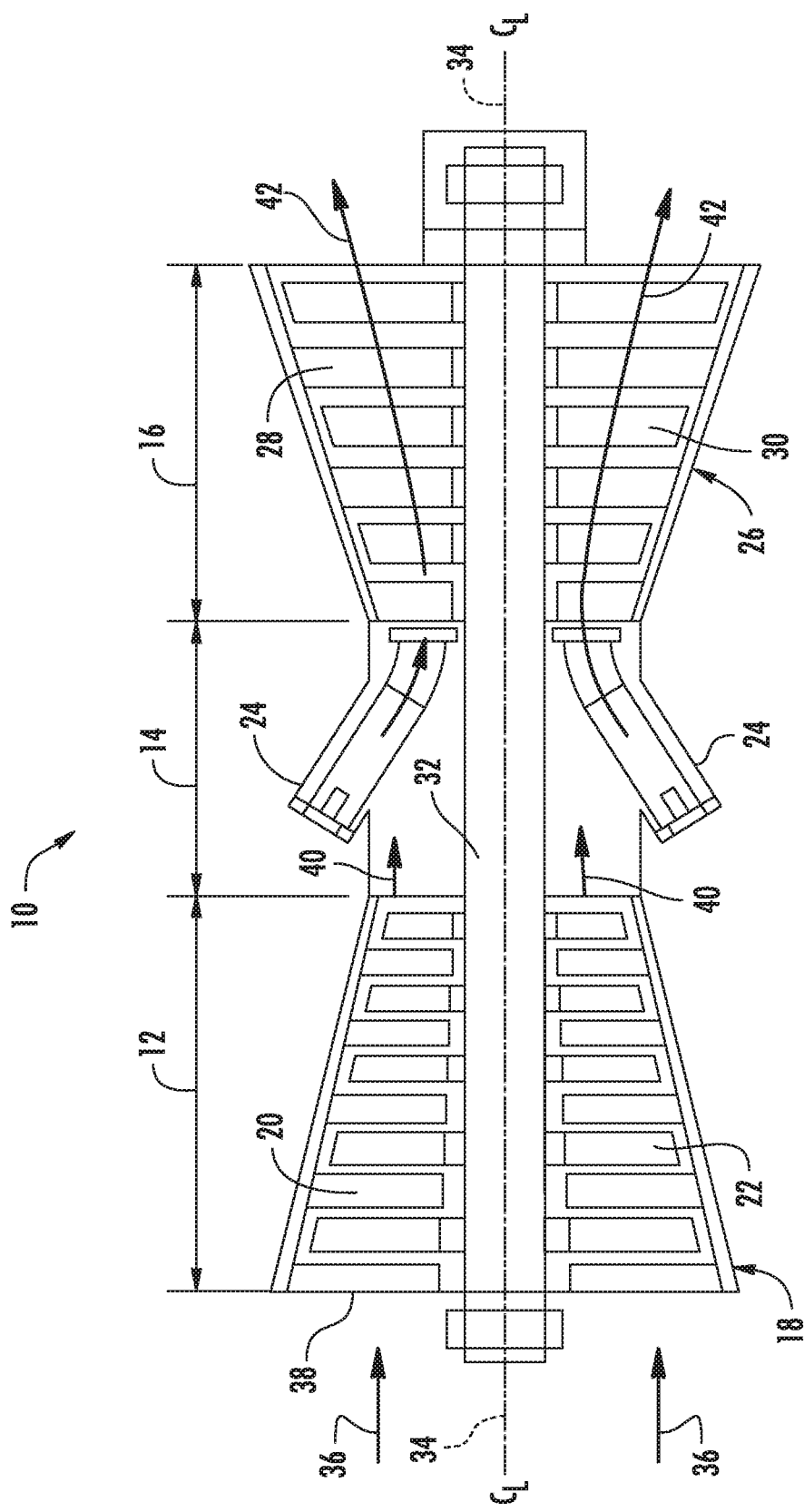
FIG. 1 is a schematic view of an exemplary gas turbine engine 10 in accordance with embodiments of the present disclosure.

Repeat use of reference characters in the present specification and drawings is intended to represent the same or analogous features or elements of the present technology.

DETAILED DESCRIPTION

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents.

Referring now to the drawings, FIG. 1 is a schematic view of an exemplary gas turbine engine 10. As shown, the gas turbine engine 10 generally includes a compressor section 12, a combustion section 14, and a turbine section 16. The compressor section 12 includes a compressor 18 having one or more rows of compressor vanes 20 and one or more rows of compressor rotor blades 22. The combustion section 14 includes one or more combustors 24. The turbine section 16 includes a turbine 26 having one or more rows of turbine nozzles 28 and one or more rows of turbine rotor blades 30. The gas turbine engine 10 also includes a shaft 32 extending along an axial centerline 34 of the gas turbine engine 10 that couples the compressor 18 and the turbine 26. The shaft 32 may be a single shaft or a plurality of shaft segments coupled together.

During operation, the gas turbine engine 10 produces mechanical rotational energy, which may be used to produce electricity. More specifically, air 36 enters an inlet 38 of the gas turbine engine 10 and flows into the compressor 18. The compressor vanes 20 direct the air 36 onto the compressor rotor blades 22, which progressively compress the air 36 to provide compressed air 40 to each of the combustors 24. The compressed air 40 mixes with a fuel, and the resulting fuel-air mixture burns within the combustors 24 to produce high temperature and high pressure combustion gases 42. From the combustors 24, the combustion gases 42 flow into the turbine 26. The turbine nozzles 28 direct the combustion gases 42 onto the turbine rotor blades 30, which extract kinetic and/or thermal energy from the combustion gases 42. This energy extraction rotates the shaft 32, thereby creating mechanical rotational energy for powering the compressor 18 and/or producing electricity.

Figure 2:
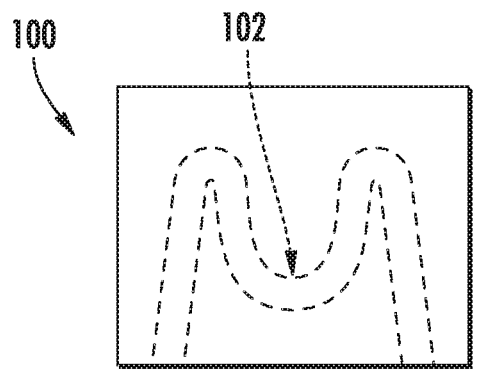
FIG. 2 is a top of an exemplary composite component in accordance with embodiments of the present disclosure.

FIG. 2 illustrates a composite component 100, which may be incorporated into the gas turbine engine 10. For example, the composite component 100 may be one of the turbine nozzles 28 or one of the turbine rotor blades 30. The composite component 100 may also be any other component of the gas turbine engine 10, such as a combustor liner, a combustion flow sleeve, a turbine shroud block, or a turbine nozzle diaphragm. Furthermore, the composite component 100 may be incorporated into other types of turbomachines, such as a turbofan. In fact, the composite component 100 may be incorporated into any suitable machine or apparatus and/or have any suitable application.

The composite component 100 may define one or more passages 102 therein. A cooling fluid, such as bleed air from the compressor 18 (FIG. 1), may flow through the passages 102, thereby cooling the composite component 100. In the embodiment shown in FIG. 2, the composite component 100 defines one passage 102 extending therethrough. In alternate embodiments, however, the composite component 100 may define two, three, or more passages 102 extending therethrough. The passage 102 may have a curved path through the component 100 as shown in FIG. 2. Furthermore, the passages 102 may also have any suitable cross-sectional shapes (e.g., circular, rectangular, etc.) and/or any suitable configuration.

Figure 3:
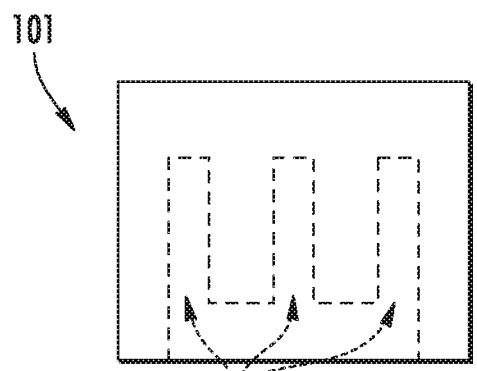
FIG. 3 is a top of another exemplary composite component in accordance with embodiments of the present disclosure.

FIG. 3 illustrates a composite component 101, which may be incorporated into the gas turbine engine 10. Like the composite component 100, the composite component 101 may be any component of the gas turbine engine 10 or any other suitable machine or apparatus. The composite component 101 may define one or more passages 103 therein. In the embodiment shown in FIG. 3, the composite component 101 defines three passages 103 extending therethrough. In alternate embodiments, however, the composite component 101 may define one, two, four, or more passages 103 extending therethrough. Unlike the passage 102 defined by the composite component 100, the passages 103 are linear. Although, the passages 103 may have any suitable configuration.

In some embodiments, the composite components 100, 101 may be formed from a ceramic matrix composite (CMC) material. In general, CMC materials include continuous or discontinuous ceramic fibers, particulates, rovings, yarns, weaves, and/or the like embedded in a ceramic matrix. The fibers are typically coated with multiple layers to tailor the fiber-matrix interface to achieve the required material properties and to facilitate processing (e.g., improve wettability). Exemplary ceramic fibers may include sapphire and silicon carbide, silicon nitride, alumina, and carbon (graphite). The ceramic matrix may be formed from silicon carbide, silicon nitride, alumina, or combinations thereof. The CMC materials may also optionally include ceramic particles (e.g., oxides of Si, Al, Zr, Y, and combinations thereof) and/or inorganic fillers. In certain embodiments, the composite components 100, 101 may be formed from a continuous fiber-reinforced ceramic, such as SiC—SiC.

Figure 4:
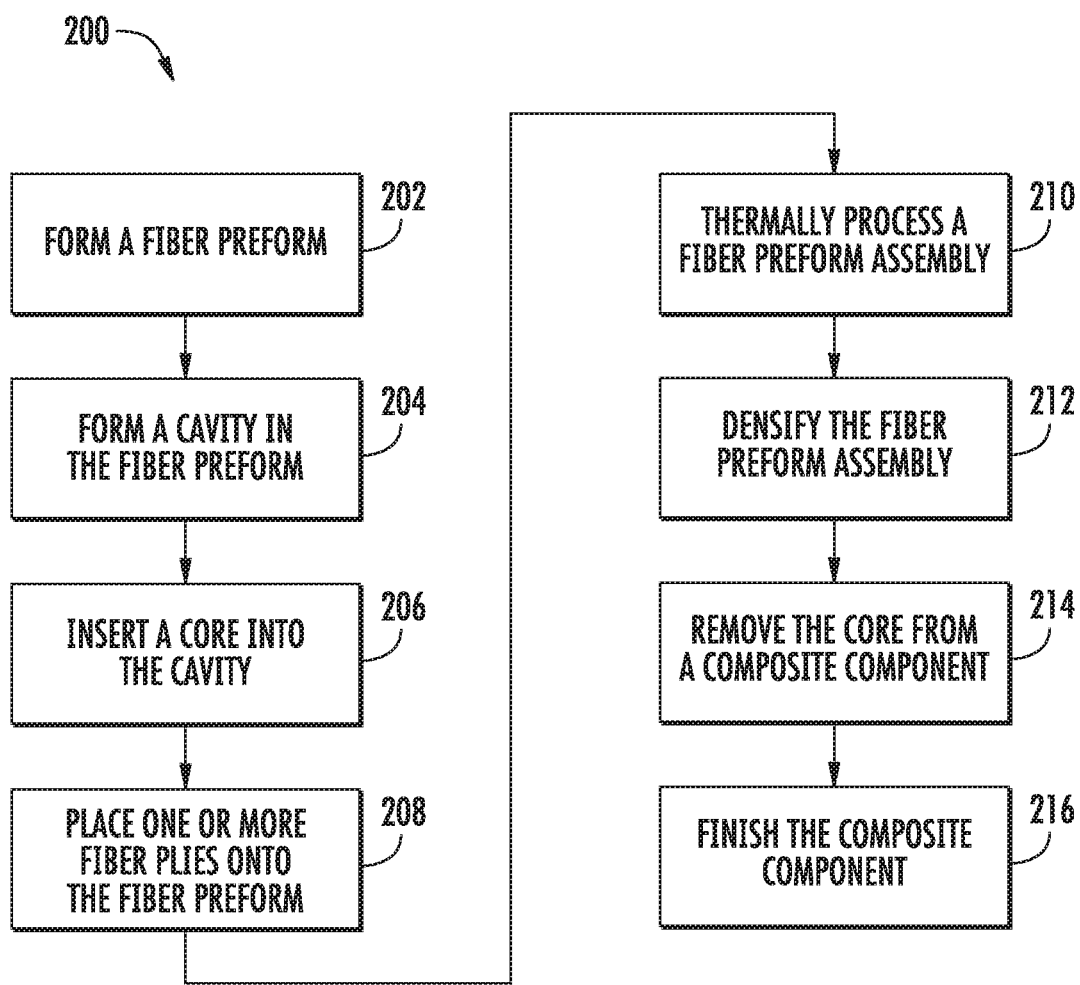
FIG. 4 is a flow chart illustrating a method for forming a passage in the composite component in accordance with embodiments of the present disclosure.
Figure 9:
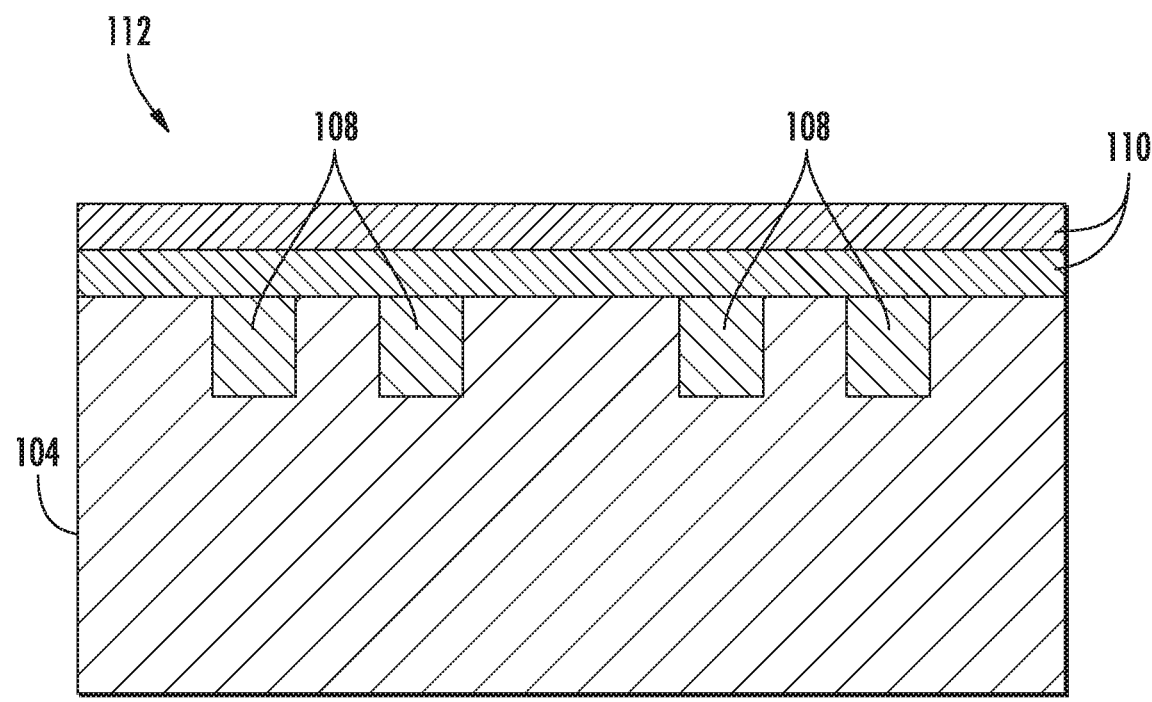
FIG. 9 is a cross-section side view of a fiber preform assembly in accordance with embodiments of the present disclosure.

FIG. 4 is a flow chart illustrating a method 200 for forming a cooling passage defined by a composite component in accordance with embodiments of the present disclosure. Method 200 will be described below in the context of forming the cooling passage 102 in the composite component 100. However, the various steps of method 200 may be used to form the cooling passage(s) 103 in the composite component 101.

Referring now to FIGS. 3-5, a fiber preform 104 is formed in step 202 of the method 200. The fiber preform 104 is a precursor to and forms a portion of the composite component 100. In this respect, the fiber preform 104 is formed from one or more fibers. In embodiments where the composite component 100 is a CMC material, the fibers may be ceramic fibers, such as silicon carbide fibers. In an exemplary embodiment of step 202, the fibers may be coated with a coating via chemical vapor deposition. The fibers may then be drawn through a slurry, such as a ceramic slurry, and wet wound onto a drum. Once wet wound, the fibers may be formed into various plies, such as unidirectional tape plies and/or cloth plies (weaves). The plies may then be laid up onto a mold, mandrel, or other lay-up device in the desired shape of the composite component 100 to form the fiber preform 104. For example, the lay-up process may include stacking or layering multiple plies to form the fiber preform 104. In alternate embodiments, however, the fibers may be impregnated with the slurry after formation of the fiber preform 104. Some embodiments of method 200 may not include step 202.

In step 204, a cavity 106 is formed in the fiber preform 104. In particular, the cavity 106 may be formed by removing a portion of the fiber preform 104. In this respect, the cavity 106 may be formed using any suitable material removal method, technique, and/or process. For example, the cavity 106 may be formed using a mechanical cutter, electrical discharge machining (EDM), or laser machining. In alternate embodiments, however, the cavity 104 may be formed by cutting the individual plies before lay-up thereof during step 202.

FIGS. 4 and 5 illustrate the fiber preform 104 upon completion of step 204. The cavity 104 forms at least a portion of the passage 102 defined by the composite component 100. As such, the cavity 106 may have a similar form (e.g., shape, size, etc.) as at least a portion of the passage 102. In the embodiment shown, the cavity 106 is open at the top thereof. In this respect, additional fiber plies may be placed onto the fiber preform 104 to completely define the passage 102 as will be discussed in greater detail below. In alternate embodiments, however, the cavity 106 may be drilled (e.g., via EDM, drilling, milling, or grinding) or otherwise formed such that the fiber preform 104 entirely defines the passage 102. In embodiments where the composite component 100 defines a plurality of passages 102, step 204 may include forming a plurality of cavities 106.

In step 206, a core 108 is inserted into the cavity 106 defined by the fiber preform 104. For example, in some embodiments, the cavity 106 may be filled with a slurry to form the core 108. The slurry may be a ceramic slurry, such as a water-dissolvable ceramic slurry, or any other suitable slurry. In alternate embodiments, the core 108 may be formed as a solid component and then placed in the cavity 106. In such embodiments, a mold, such as a plastic mold, having a mold cavity corresponding to the desired shape of the core 108 may be formed. In particular, the mold may be formed via a suitable additive manufacturing process, such as three-dimensional printing. The mold cavity may then be filled with a slurry. The mold and slurry are heated in a furnace to burn off the mold and cure and sinter the slurry, thereby forming the core 108. In further embodiments, however, the core 108 may be formed using any suitable process (e.g., slip casting, hot isostatic pressing, or sintering).

FIGS. 6 and 7 illustrate the fiber preform 104 upon completion of step 206. As shown, the cavity 106 defined by the fiber preform 104 is filled with the core 108 (e.g., the water-dissolvable ceramic slurry). In this respect, the core 108 may conform to the shape, size, and configuration of the cavity 106. As will be discussed in greater detail below, the core 108 prevents the cavity 106 and the resultant passage 102 from collapsing or filling with material during thermal processing and densification.

In step 208, one or more fiber plies 110 are placed on the fiber preform 104. In particular, the fiber plies 110 may be stacked or layered on the fiber preform 104. In this respect, the fiber preform 104, the core 108, and the fiber plies 110 collectively form a fiber preform assembly 112 having the same shape, size, and configuration of the composite component 100. In some embodiments, multiple fiber preforms 102 may be laid up together to form the fiber preform assembly 112. The fiber plies 110 are generally formed as tapes, weaves, or cloths from one or more fibers. The fibers used to form the fiber plies 110 may be the same type (e.g., ceramic fibers, such as silicon carbide fibers) as the fibers used to form the fiber preform 104.

As shown in FIG. 8, the fiber plies 110 may be positioned over the core 108. In this respect, the fiber plies 110 define the portion (i.e., the top) of the passage 102 not defined by the fiber preform 104. In embodiments where the fiber preform 104 entirely defines the passage 102, the fiber plies 110 may be laid elsewhere on the fiber preform 104. Furthermore, step 208 may be optional if the fiber preform 104 entirely defines the passage 102 core 108. In such instances, the fiber preform 104 may define the entire shape of the composite component 100.

In step 210, the fiber preform assembly 112 is thermally processed. For example, in some embodiments, thermal processing may include autoclave processing followed by a burn-out cycle. More specifically, upon completion of step 208, the fiber preform assembly 112 may be placed in an autoclave and compacted or debulked at elevated temperature and/or pressure. The autoclave processing may also begin curing the fiber preform assembly 112. After the autoclave processing, the fiber preform assembly 112 is in a green state. The fiber preform assembly 112 may then undergo a burn-out cycle (pyrolysis). During burn-out, the fiber preform assembly 112 is placed in a furnace and heated in an inert atmosphere or under a vacuum. This melts, sublimates, and/or converts the various binders, plasticizers, dispersants, solvents, and other processing materials in the fiber preform assembly 112. During burn-out, the fiber preform assembly 112 may be positioned to allow the melted or gaseous reaction products to exit out of the fiber preform assembly 112, thereby removing these reaction products from the fiber preform assembly 112. Various tooling or powder beds may support the fiber preform assembly 112 to allow proper breathing. As mentioned above, the core 108 prevents the passage 102 from collapsing during thermal processing (e.g., during autoclave consolidation or pyrolysis). In alternate embodiments, the thermal processing of the fiber preform assembly 112 may include other thermal processing operations in addition to or in lieu of the autoclave processing and burn-out cycle. Upon the completion of step 210, the fiber preform assembly 112 is highly porous. In particular, the fiber preform assembly 112 is typically a network of carbon, particulates, and ceramic fibers.

In step 212, the fiber preform assembly is densified. For example, the fiber preform assembly 112 may be densified via melt infiltration. More specifically, the fiber preform assembly 112 may be placed in a vacuum furnace and heated to temperatures above the melting point or eutectic temperature of the infiltrant (typically above 1400° C.). An infiltrant, such as molten metal or metalloid (e.g., molten silicon), infiltrates the preform assembly 112, thereby filling the porosity created in the fiber preform assembly 112 as a result of the thermal processing of step 210. The infiltrant then reacts with components of the fiber preform assembly 112 (e.g., carbon introduced by drawing the fibers through the slurry in step 202) to form the matrix (e.g., silicon carbide) of the composite component 100. As indicated above, the core 108 prevents the passage 102 from filling with infiltrant during densification. Alternately, the fiber preform assembly 112 may be densified using Silcomp, chemical vapor infiltration, polymer infiltration and pyrolysis, oxide/oxide processes, molten metal submersion, vacuum hot pressing, or any other suitable densification process. Upon completion of step 112, the fiber preform assembly 112 is densified and the matrix is transformed into a ceramic, thereby forming the finished composite component 100.

In step 214, the core 108 is removed from the composite component 100. The core 108 may be removed using any suitable method, technique, and/or process. If the geometry permits (e.g., the composite component 101 shown in FIG. 3), the core 104 may simply be removed mechanically (e.g., removed by hand, mechanical shaking, or via a mechanical tool). The core 108 may also be removed by heating and/or chemical treatment. For example, the composite component 100 may undergo heat treatment, vacuum heat treatment, inert gas treatment, acid treatment, base treatment, or treatment with another suitable solvent. In this respect, the core 104 may be removed via melting, dissolution, sublimation, evaporation, or the like. For example, if the core 108 is formed of a water-dissolvable ceramic material, water may be used to dissolve the core 108. Nevertheless, the core 108 may be removed via any suitable technique. Step 214 may be performed after steps 210 and 212. That is, the core 108 may be removed from the composite component 100 after thermal processing and densification. Furthermore, in some embodiments, the entirety of the core 108 may be removed during step 214 and after completion of steps 210 and 212.

After removal of the core 108, the composite component 100 may optionally be finished in step 216. Finishing the composite component 100 may include machining and/or applying an environmental barrier coating. Other processes or steps also may be performed to finish the composite component 100 and prepare the composite component 100 for use in the gas turbine engine 10.

As discussed in greater detail above, the method 200 disclosed herein includes positioning the core 108 within each of the passages 102, 103 defined by the composite component 100, 101. The cores 108 prevent the fiber plies 110 from sagging or collapsing into the passages 102, 103 during thermal processing. In fact, the fiber plies 110 are particularly prone to sagging when the core 108 is not used if the width of the passage 102, 103 is at least twice as great as the height thereof. The core 108 also prevents infiltrant from entering the passages 102, 103 during densification. In this respect, and unlike with conventional methods, the passages 102, 103 retain their desired cross-sectional shape and size upon completion of method 200. That is, the passages 102, 103 are not occluded in any manner by the fiber plies 110 or the infiltrant. As such, more cooling air may flow through the passages 102, 103 than through passages formed via conventional methods, thereby providing greater cooling to the composite component 100, 101. Accordingly, the greater cooling provided by the passages 102,103 increases the service life of the component 100, 101.

Method 200 also provides other advantages. For example, method 200 permits the use of matrix plies in lieu of fiber plies 110. Furthermore, method 200 allows the fibers in the fiber plies 110 to be oriented in the primary stress direction of the composite component 100, 101 and limits fibers running off-angle (up to 90 degrees) from the stress direction.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for forming a passage in a composite component, the method comprising:
   forming a cavity in a fiber preform, the cavity forming a portion of the passage;
   inserting a core into the cavity;
   placing one or more fiber plies onto the fiber preform to form a fiber preform assembly;
   thermally processing the fiber preform assembly;
   densifying the fiber preform assembly to form the composite component; and
   after densifying the fiber preform to a final density, removing the core from the composite component.

2. The method of claim 1, wherein forming the cavity comprises removing material from the fiber preform.

3. The method of claim 1, wherein inserting the core comprises filling the cavity with a slurry.

4. The method of claim 1, further comprising:
   forming a mold for the core, the mold defining a mold cavity;
   filling the mold cavity with a slurry;
   heating the mold to cure and sinter the slurry to form the core; and
   burning off the mold.

5. The method of claim 1, wherein thermally processing the fiber preform assembly comprises autoclave processing the fiber preform assembly.

6. The method of claim 1, wherein thermally processing the fiber preform assembly comprises burning-out the fiber preform assembly.

7. The method of claim 1, wherein densifying the fiber preform assembly comprises melt infiltrating the fiber preform assembly with an infiltrant.

8. The method of claim 7, wherein the infiltrant is formed from a metal or metalloid.

9. The method of claim 1, wherein removing the core comprises dissolving the core with water.

10. The method of claim 1, wherein the fiber preform comprises a plurality of ceramic fibers.

11. The method of claim 1, wherein the core is formed from a ceramic material.

12. The method of claim 1, wherein the fiber preform has the same shape as the composite component.

13. A method for forming a passage in a ceramic matrix composite component, the method comprising:
   forming a fiber preform comprising a plurality of ceramic fibers;
   forming a cavity in the fiber preform, the cavity forming a portion of the passage;
   inserting a core into the cavity;
   placing one or more ceramic fiber plies onto the fiber preform to form a fiber preform assembly;
   thermally processing the fiber preform assembly;
   densifying the fiber preform assembly to form the ceramic matrix composite component; and
   after densifying the fiber preform to a final density, removing the core from the ceramic matrix composite component.

14. The method of claim 13, wherein inserting the core comprises filling the cavity with a slurry.

15. The method of claim 13, further comprising:
   forming a mold for the core, the mold defining a mold cavity;
   filling the mold cavity with a slurry;

heating the mold to cure and sinter the slurry to form the core; and burning off the mold.

16. The method of claim 13, wherein thermally processing the fiber preform assembly comprises autoclave processing the fiber preform assembly and burning-out the fiber preform assembly, and wherein densifying the fiber preform assembly comprises melt infiltrating the fiber preform assembly with an infiltrant.

17. The method of claim 13, wherein removing the core comprises dissolving the core with water.

* * * * *